Sept. 8, 1959 J. S. BAER ET AL 2,903,687

KEYBOARD MECHANISM

Filed Dec. 13, 1954 4 Sheets-Sheet 1

INVENTORS
JOHN S. BAER
& EDWARD A. DAMERAU
BY
Morris Rabkin
ATTORNEY

Sept. 8, 1959 J. S. BAER ET AL 2,903,687

KEYBOARD MECHANISM

Filed Dec. 13, 1954 4 Sheets-Sheet 2

INVENTORS
JOHN S. BAER
BY & EDWARD A. DAMERAU
Morris [illegible]
ATTORNEY

INVENTORS
JOHN S. BAER
& EDWARD A. DAMERAU
BY
Morris A. Rabkin
ATTORNEY

INVENTORS
JOHN S. BAER
& EDWARD A. DAMERAU
BY
Morris Rabkin
ATTORNEY 2,903,687

KEYBOARD MECHANISM

John S. Baer, Woodbury, and Edward A. Damerau, Pine Hill, N.J., assignors to Radio Corporation of America, a corporation of Delaware Application December 13, 1954, Serial No. 474,934

10 Claims. (Cl. 340—365)

This invention relates to key-operated mechanisms, and particularly to a keyboard mechanism for entering information into an information handling system.

Manually operated keyboards are widely used for the entry of data in information handling machines. The ease and speed with which the data is entered and the accuracy with which the entry is effected depend in large measure on the construction and operation of the keyboard.

A keyboard mechanism should provide a precise, uniform, and easy response to manual actuation. For cooperation with information handling systems using electrical signals, the mechnaism should accurately generate signals of uniform strength and duration for further data processing. The keyboard should, if possible, preclude certain types of human errors which are likely to occur. These types of errors include the simultaneous actuation of two or more keys, and the actuation of keys in a too rapid sequence.

For flexibility in entering information, it may be desired to provide a different output signal for each selected key, and also, at the same time, coded signal combinations suitable for an automatic data-processing system. The different output signals may represent, for example, individual decimal values. The coded combinations may provide decimal equivalents in a binary form. Through use of the coded combinations, information may be stored in a paper tape as perforation patterns, or on magnetic tape as magnetized spots.

Accordingly, an object of the present invention is to provide, for data-processing systems, an improved input mechanism having greater flexibility than the mechanisms of the prior art.

Another object of this invention is to provide an improved input mechanism for data-processing systems which operates more simply and effectively in providing a coded output than the mechanisms heretofore known.

A further object of this invention is to provide an improved keyboard which is more free from error and more easily operable than prior keyboards.

Another object of this invention is to provide an improved keyboard which, when operated, provides coded outputs of specified signal strength and duration.

A further object of this invention is to provide an improved keyboard having an easier and at the same time more precise operation than the keyboards heretofore known.

Still another object of this invention is to provide an improved keyboard mechanism which simply and efficiently precludes simultaneous operation of more than one key.

Yet another object of this invention is to provide an improved keyboard mechanism which provides coded outputs on the actuation of individual keys and which is free from confusion of successive coded combinations.

A further object of this invention is to provide an improved keyboard mechanism which simply, reliably, and economically minimizes errors occurring from improper actuation and provides coded outputs of uniform strength and duration.

A keyboard mechanism constructed in accordance with the invention may be of the type having one key for each digital value. Multi-digit numbers are provided by successive actuations of the keys. Each key on the keyboard includes a straight-sided holding notch and a driving notch having one slanted side. A rotary solenoid-driven locking plate is movable in the line of each of the holding notches in the key bars. When a key is selected, the rotary solenoid moves the locking plate toward the holding notches in the unselected keys. The selected key, however, is moved a sufficient distance for the slanted side of the driving notch to be in the line of the moving locking plate. Under control of the rotary solenoid the locking plate engages the driving notch and completes a cyclical movement in depressing and holding down the selected key. Until the cycle is completed and the selected key is released, all other keys are locked against movement by the locking plate.

As the rotary solenoid carries out a cycle, the selected key is held at an actuating position for a predetermined time. When at the actuating position, each key moves certain ones of a group of notched code bars, depending upon the output signal combination desired for the selected key. The code bars in turn actuate small electro-mechanical switches, providing the desired output signal combination. At the same time the selected key actuates only one of a group of small electro-mechanical switches, thus providing an additional single output characteristic of the key. If two or more keys are selected simultaneously, none of the keys are actuated because of a locking ball arrangement which prevents such simultaneous action.

The novel features of the invention, as well as the invention itself, both as to its organization and method of operation, will best be understood from the following description, when read in connection with the accompanying drawings, in which like reference numerals refer to like parts, and in which.

Figure 1:
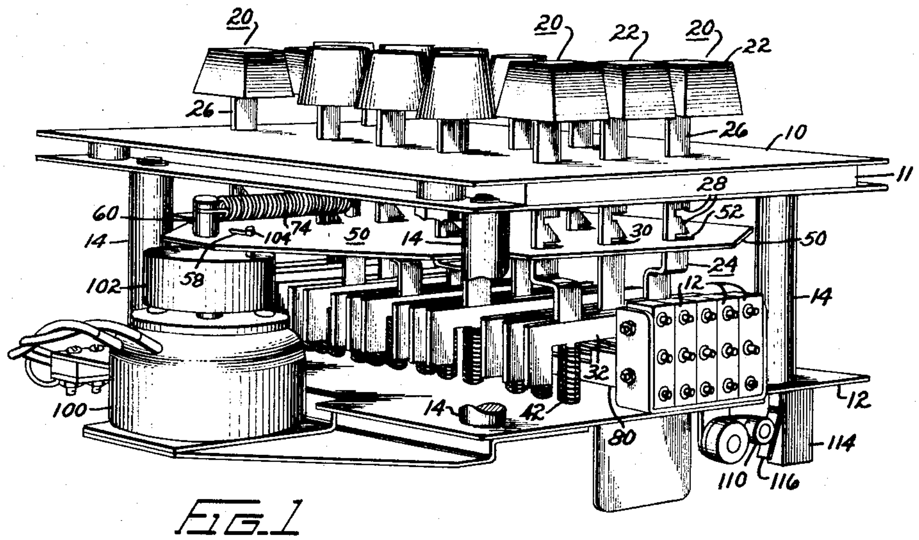
Fig. 1 is a perspective view, partially broken away, of an arrangement for practicing the invention. The arrangement is viewed as from the left rear side, with respect to the location from which the mechanism is normally operated.

Some of the above figures have, for clarity, been simplified by the omission of some parts shown in detail in other figures. The mechanism (refer to Fig. 1) includes a base structure having a face plate 10 including a damping pad 11. A base plate 12 is mounted in fixed relation to the face plate 10 and in a plane substantially parallel to the face plate 10. Corner posts 14 fixed to each of the plates 10 and 12 space and support the face plate 10 from the base structure 12. The structure is substantially rectangular in shape. The face plate 10 may be regarded as, and is here called, the top of the base structure. In a normal operating position the face plate 10 is the top facing of the mechanism, and an operator views the structure from the front (the view of Fig. 5). For convenience, the parts of the mechanism are described with reference to such a normal operating position. Thus a key above the face plate 10 moves toward the face plate 10 and the base plate 12 when it is depressed.

A number of keying mechanisms 20 are mounted between the base plate 12 and the face plate 10 normal to the planes of the plates 10 and 12. Each keying mechanism 20 includes a key button 22 spaced above the face plate 10 as shown in the perspective view of Fig. 1. Fifteen keying mechanisms 20 are here illustrated. Nine of the key buttons 22 may be placed in a square central array to represent decimal digits from 1 to 9. A zero key and two special character keys may be employed on the left side, and three special character keys may be employed on the right side. Note that the perspective of Fig. 1 views the mechanism from the left rear corner.

Each keying mechanism 20 (refer also to Figs. 3 and 4) includes a key member 24 having shaped surfaces. Each key member 24 includes a stem portion 26, a free end of which supports the key button 22. The stem portion 26 of each key 24 fits movably in the face plate 10. Below the face plate 10 each stem portion has a driving notch 28 whose upper side is parallel to the face plate 10, and whose lower side is slanted down, away from the face plate 10, to provide a driving edge. The upper end of the slanted portion or driving edge of the driving notch terminates in a small flat portion 29 parallel to the face plate 10. Below each driving notch 28 in the stem portion 26 is a holding notch 30, both sides of which are parallel to the planes of the face plate 10 and the base plate 12. The upper side of the holding notch 30 may be said to provide a holding edge. Below each holding notch 30, the stems 26 may be bent or shaped so that when viewed in the front elevation (Fig. 5) the lower portions of the keying mechanisms 20 are equally spaced from each other.

Each keying mechanism 20 also includes a selector bar 32 parallel to the face plate 10 and base plate 12 and mounted normal to the stem portion 26 at the base of the stem 26. A number of fingers extend from each selector bar 32 through apertures in the base plate 12. Like fingers from the selector bars 32 comprise individual sets of fingers, and all the fingers of each set are in a line substantially parallel to the front of the mechanism. The fingers (best seen in Fig. 3) include a decimal switch finger 34, a start control finger 36, and a locking ball finger 38. Each decimal switch finger 34 registers, when the associated key 20 is depressed, with an opening in the base plate 12. A spring 40 mounted between the base plate 12 and the selector bar 32 around the start control finger 36 biases the keying mechanism 20 away from the base plate 12. The start control finger 36 has a sliding fit with an aperture in the base plate 12. A biasing spring 42 also surrounds each locking ball finger 38, biasing the keying mechanism 20 away from the base plate 12. The locking ball finger 38 has a moving fit with an aligned aperture in the base plate 12. Thus each start control finger 36 and locking ball finger 38 of a keying mechanism 20 guides the keying mechanism 20 in a movement normal to the face plate 10 and base plate 12. The associated springs 40 and 42 tend to maintain the keying mechanism away from the base plate 12. Between each start control finger 36 and locking ball finger 38, each selector bar 32 has a central section utilized for code generating purposes.

Figure 2:
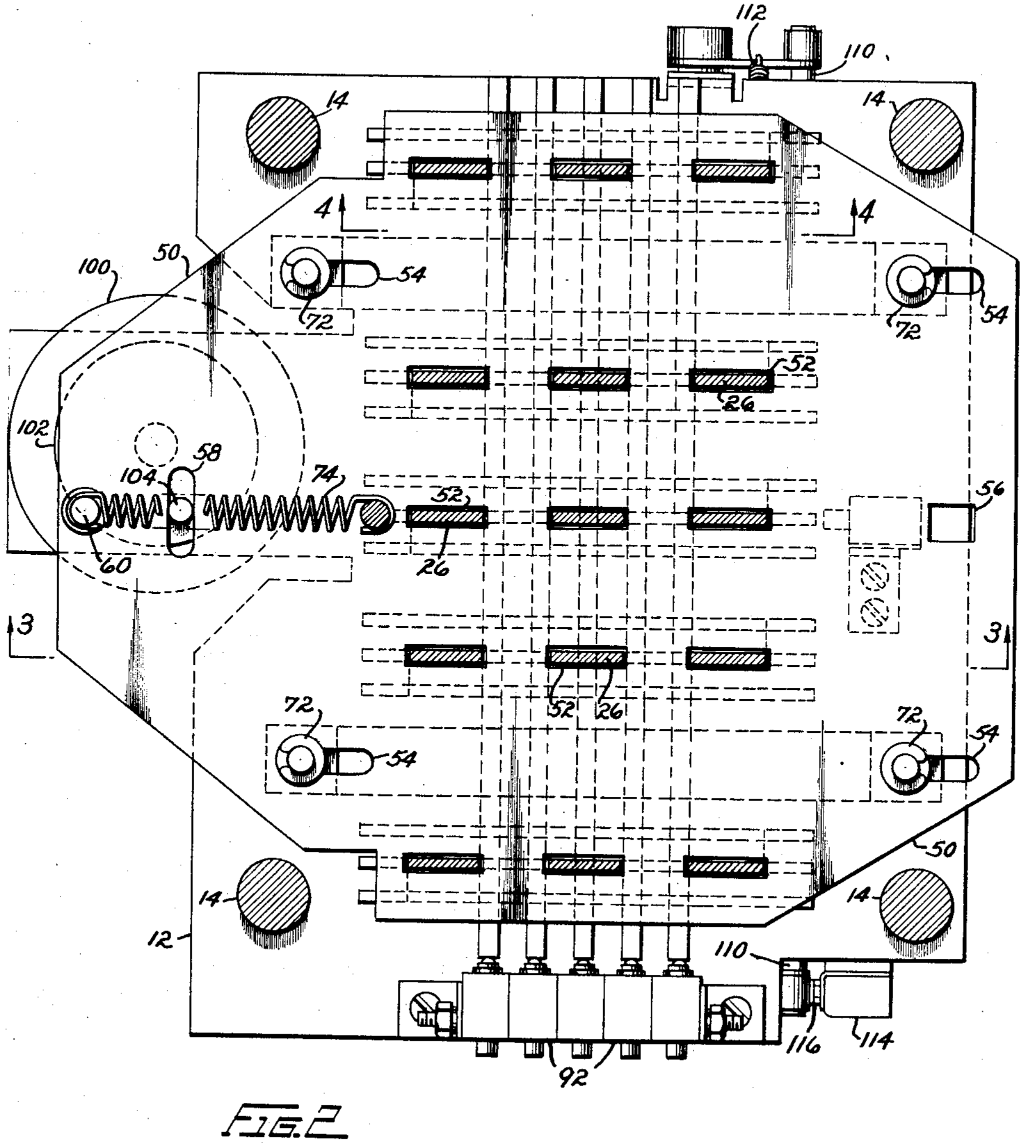
Fig. 2 is a sectional plan view of the arrangement of Fig. 1, the section being taken along line 2—2 in Fig. 3, looking in the direction of the appended arrows.

A locking plate 50 is positioned parallel to and between the face plate 10 and the base plate 12. The locking plate 50 (refer here also to Fig. 2) includes a number of locking holes 52. Each locking hole 52 is in the line of a different stem 26 portion of a keying mechanism 20. Guide slots 54 are provided in the locking plate 50 at each of the corners of the locking plate 50. The guide slots 54 are elongated in the front to back direction of the locking plate 50. The locking plate 50 also includes a switch control slot 56 at its front end and a movement control slot 58 at its back end. A stud 60 is fixed to the locking plate 50 at the back end adjacent a movement control slot 58.

The locking plate 50 is mounted on support bars 70 (best seen in Figs. 3 and 5) fixed to the base plate 12. The individual guide slots 54 in the locking plate 50 are in line with different ones of the support bars 70. Detachable guide pins 72, one on each support bar 70, move within the guide slots 54 and permit locking plate 50 movement in the direction of elongation of the guide slots 54. A spring 74 couples the fixed stud 60 on the locking plate 50 to the face plate 10 and biases the locking plate 50 toward the front of the mechanism.

Code bars 80 are positioned in the mechanism below the central section of the selector bars 32 of each keying mechanism 20. The code bars 80 are substantially parallel to the face plate 10 and base plate 12 and normal to the central sections of the selector bars 32. For illustration, five code bars 80, for generating a five binary digit code, are shown. Each code bar 80 (refer to Fig. 5) includes a pair of guide slots 82 and a number of straight notches 84 and slanted notches 86. The notches 84 and 86 are positioned so that when a selector bar 32 is moved toward a code bar 80 the selector bar 32 registers with a straight notch 84 or contacts the slanted surface of a slanted notch 86. The slanted surface of the slanted notch 86 is such (refer also to Fig. 4) that the selector bar 32 wedges the code bar 80 to the left, as viewed in the front elevation. Each selector bar 32 is in line with a predetermined pattern of notches 84 and 86 across the code bars 80. Where a selector bar 32 is moved downward by actuation of a keying mechanism 20, the code bars 80 are displaced or not displaced, depending upon the notched pattern provided to the selector bar 32.

Figure 5:
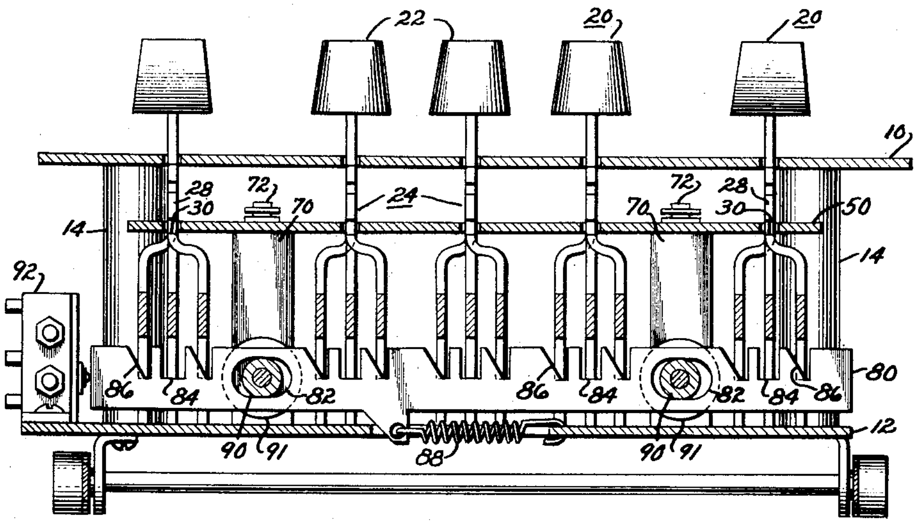
Fig. 5 is a front section of the arrangement, taken along section line 5—5 in Fig. 3, looking in the direction of the appended arrows.
Figure 6:
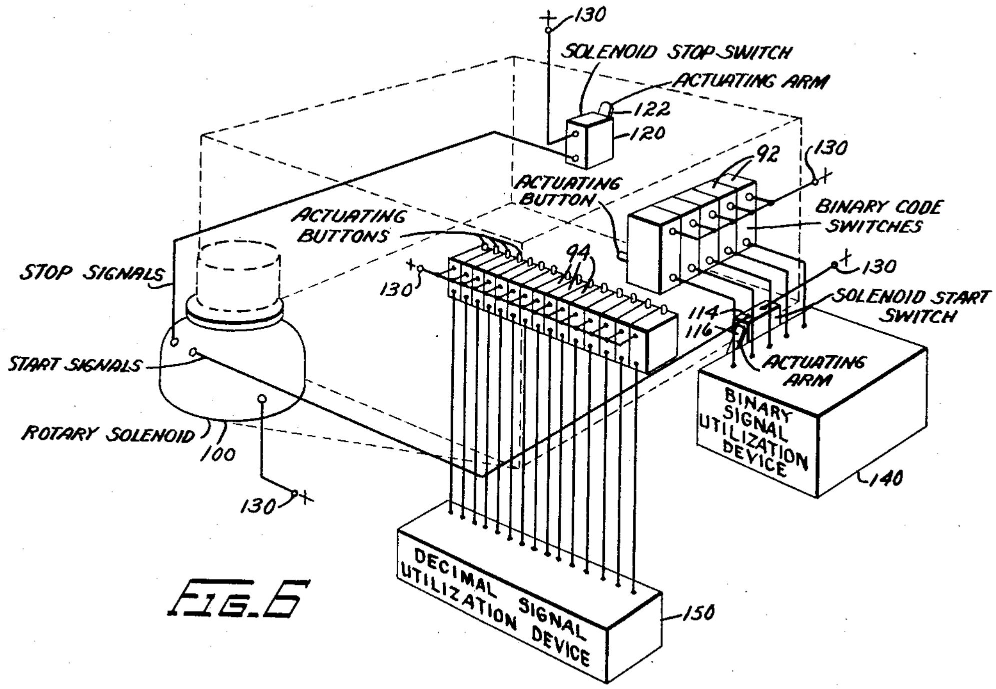
Fig. 6 is a perspective view showing the circuitry employed and the physical arrangement of the switches with respect to the arrangement, represented in phantom by broken lines.

A different spring 88 couples each code bar 80 to the base plate 12 and biases the code bar 80 to the right, as viewed in the front elevation of Fig. 5. The spring 88 maintains the code bar 80 so that the straight sided notches 84 are in the line of the associated selector bars 32. Guide shafts 90 extend from the front to the back of the mechanism. The guide shafts 90 are detachably mounted in the support bars 70 and ride in the guide slots 82 of the code bars 80. The guide shafts 90 may have spacing members 91 of larger diameter than the guide shaft 90 positioned between the separate code bars 80, holding but not restraining the code bars 80.

A number of binary code switches 92 are mounted on the base plate 12 at the left side of the mechanism (see Figs. 1, 2, 5 and 6). Each binary code switch 92 is in the line of the end of a different code bar 80. When a code bar 80 is moved to the left by its associated selector bar 32 the code bar 80 closes the binary code switch. A number of decimal code switches 94, one for each keying mechanism 20, are mounted under the base plate 12 in the line of the decimal switch fingers 34 on the keying mechanism 20. Each decimal code switch 94 is actuated by a different decimal switch finger 34 when the switch finger 34 is moved through the aperture in the base plate 12.

A rotary solenoid 100 (see Figs. 1, 2 and 3) is attached to the base plate 12 at the back of the mechanism. A rotary solenoid, such as the solenoid 100 employed in this arrangement, starts a rotational movement when actuated. The movement is continued, within limits, until a stop signal is provided, after which the solenoid 100 is released. In the present system, the solenoid is returned to its original position by the biasing force of the spring 74 coupled to the locking plate 50. The initial movement of the solenoid is in the clockwise direction, as seen in the plan view, and the return movement is in the counterclockwise direction. A hub 102 is mounted on the solenoid 100 and rotates with the solenoid 100 about the same axis. A pin 104 mounted on the hub 102 rides in the movement control slot 58 of the locking plate 50. Angular movement of the solenoid 100 provides a linear movement of the locking plate 50 through the pin 104 and slot 58 arrangement, sometimes referred to as a Scotch yoke.

A bail mechanism is employed to effect starting of the solenoid 100. The bail mechanism comprises a start control bar 110 pivotally mounted in the base plate 12. The start control bar is in the line of all the start control fingers 36 on the keying mechanisms 20 and may be moved downward by any one of the start control fingers 36 through the associated apertures in the base plate 12. A spring 112 coupling the start control bar 110 to the base plate 12, biases the start control bar 110 toward the base plate 12.

A solenoid start switch 114 having an actuating arm 116 is mounted adjacent the start control bar 110 on the base plate 12. When the start control bar 110 is pivoted by a start control finger 36, the actuating arm 116 closes the solenoid start switch 114. A solenoid stop switch 120 (see Fig. 3) has an actuating arm 122 which extends through the switch control slot 56 in the locking plate 50. Movement of the locking plate 50 toward the solenoid 100 causes the edge of the switch control slot 56 to engage the actuating arm 122 and to close the solenoid stop switch 120.

To prevent simultaneous actuation of more than one keying mechanism 20, a locking arrangement (see also Fig. 7) is mounted under the base plate 12 in the line of the locking ball fingers 38 from the various keys 24. This arrangement includes a channel member 124 fixed to the underside of the base plate 12, parallel to the front of the mechanism, and in the line of the locking ball fingers 38. A number of locking balls 126 are contained between the channel member 124 and the base plate 12. The locking balls 126 are free to move within limits along the channel member 124. The diameters of the locking balls 126 are the same as the distance between the locking ball fingers 38. The end to end distance of the channel member 124 is only enough to permit one locking ball finger 38 to wedge between the locking balls 126. If more than one keying mechanism 20 is selected and moved downward at the same time, the associated locking ball fingers 38 wedge together a group of locking balls 126, and none of the keying mechanisms 20 can be fully depressed.

A circuit arrangement (refer to Fig. 6) which may be employed includes a direct current source 130 coupled to the solenoid 100, to the binary code switches 92, and to the decimal code switches 94. Terminals of the binary code switches 92 are coupled to a binary signal utilization device 140. Terminals of decimal code switches 94 are coupled to a decimal signal utilization device 150. The direct current source 130 is also coupled to the solenoid start switch 114 and the solenoid stop switch 120. The solenoid start switch 114 has a terminal coupled to a start input of the rotary solenoid 100. The solenoid stop switch 120 has a terminal coupled to the stop input of the rotary solenoid 100.

In operation, referring now to the various figures of the drawing, manual depression of any key button 22 commences a cycle in which the proper decimal output signal and the desired binary code signal combination are provided. An operator selects the key button 22 and provides initial depression of the key button 22.

As the selected keying mechanism 20 (see particularly Fig 3) moves downward toward the base plate 12 the start control finger 36 engages and pivots the start control bar 110. The start control bar 110 in turn engages and actuates the arm 116 of the solenoid start switch 114. The solenoid start switch 114 is closed and a start signal is provided (see Fig. 6) to the rotary solenoid 100. With the starting of the cycle of movement of the rotary solenoid 100 the keying mechanism 20 operation becomes power assisted.

When actuated, the solenoid 100 begins a clockwise rotation. The pin 104 (see Figs. 1 and 2) on the hub 102 coupled to the solenoid 100 moves within the movement control slot 58 on the locking plate 50. The pin 104 therefore moves the locking plate 50 toward the solenoid 100. In the rest position, with no keying mechanism 20 actuated, each locking hole 52 is centered about a key stem 26, as in Fig. 2. As the locking plate 50 moves toward the solenoid 100, each locking hole 52 moves out of center with respect to the associated key stem 26. An engaging edge of each locking hole 52 on the locking plate 50 enters between the sides of the different holding notches 30 on the key stems 26 at all but the selected keying mechanism 20.

In order for the start control bar 110 to actuate the solenoid start switch 114, the slanted surface of the driving notch 28 of the selected key 24 is under the lower surface of the locking plate 50. As the locking plate 50 (see Figs. 1, 3 and 4) moves toward the solenoid 100 the front, engaging edge of the registering locking hole 52 contacts the slanted driving edge of the driving notch 28 and wedges the keying mechanism 20 downward. The motion of the rotary solenoid 100 is sufficiently rapid for the locking plate 50 to take over and complete the key-depressing action for the operator. The operator must supply a positive impetus to the key button, but need not exert a strong force or a force of extended duration. Once begun, the cycle is completed automatically.

The downward movement of the selected keying mechanism 20 continues and the locking plate 50 reaches the flat segment on the slanted portion of the driving notch 28. With the edge of the locking plate 50 at this flat segment, the keying mechanism 20 is at the limit of its downward movement. The locking plate 50 holds the keying mechanism 20 at this lower limit for a definite period, as the locking plate 50 continues to move rearward toward the rotary solenoid 100. The extent of the rearward movement of the locking plate 50 is limited by the actuating arm 122 which engages the side of the switch control slot 56 and closes the solenoid stop switch 120. The solenoid stop switch 120 provides a stop signal (see Fig. 6) to the solenoid 100, which is deenergized. The biasing spring 74 coupled to the locking plate 50 rotates the solenoid 100 counter-clockwise (as seen in the plan view of Fig. 2) to its starting position, and returns the locking plate 50 to its original position with each locking hole 52 surrounding a key stem 26. Thus the locking plate 50 disengages the keying mechanism 20 which returns, under force of the associated springs 40, 42 to its normal, undepressed, position. The cycle of operation of the solenoid 100 is completed.

A number of separate actions are provided by each keying mechanism 20. Each selector bar 32 (see particularly Figs. 4 and 5) on a selected keying mechanism 20 encounters a certain pattern of notches 84 or 86 at the associated code bars 80. If, for example, the selected key 24 is to generate a binary code output of 11111, signals are to be provided, in this example, in each of the five output channels. The selector bar 32 for the selected key 24 therefore encounters slanted notches 86 at each of the code bars 80. The selector bar 32 wedges each of the code bars 80 against its associated binary code switch 92. The binary code switches 92 close and complete circuits providing output signals in each output channel to the binary signal utilization device 140.

A binary zero here corresponds to no output signal. To provide digital values of binary zero in a combination, the code bars 80 provide straight sided notches 84 to the registering keying mechanism 20. The code bar 80 accordingly does not move to close the binary code switch 92 and no output signal is provided in the output channel. The coding arrangements of the notches 84 and 86 under each of the selector bars 32 thus represent and generate the desired binary code combinations for the several keying mechanisms 20.

Another action, occurring when a keying mechanism 20 is fully depressed, is the provision of a decimal output signal. Although here called a decimal output because illustrated with a keyboard having separate keys for numerical values from 0 to 9, the outputs are more broadly to be regarded as individual outputs, each corresponding to a different keying mechanism 20. When a keying mechanism 20 is fully depressed, the decimal switch finger 34 (see here Figs. 3 and 6) extends through the aligned aperture in the base plate 12 and closes the associated decimal code switch 94. The decimal code switch 94 provides, concurrently with the binary code output, a decimal signal to the decimal signal utilization device 150.

Figure 3:
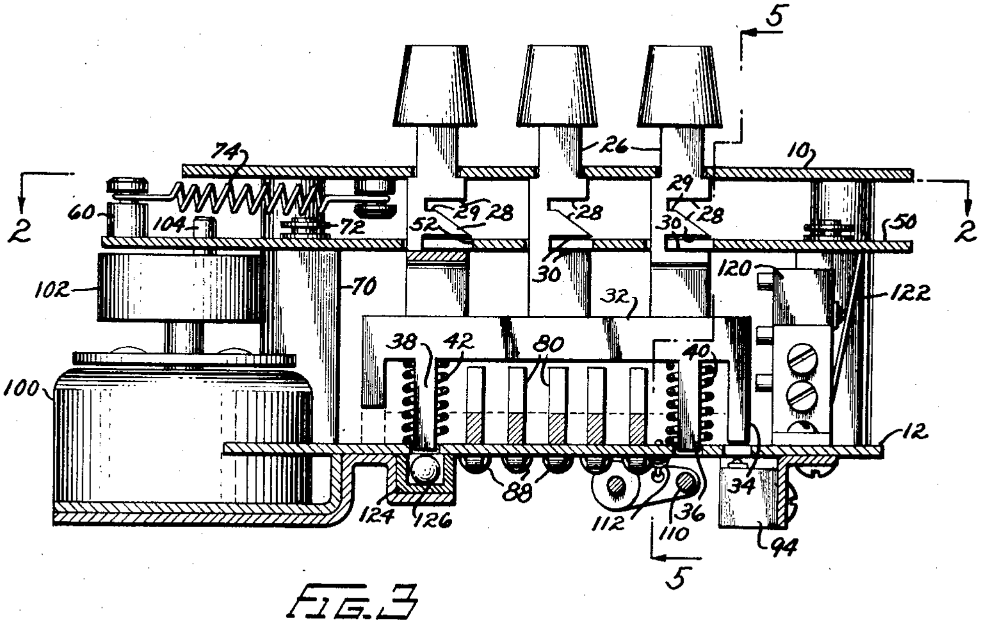
Fig. 3 is a side section of the arrangement, taken along section line 3—3 of Fig. 2, looking in the direction of the appended arrows. A locking ball arrangement is shown in this view.
Figure 4:
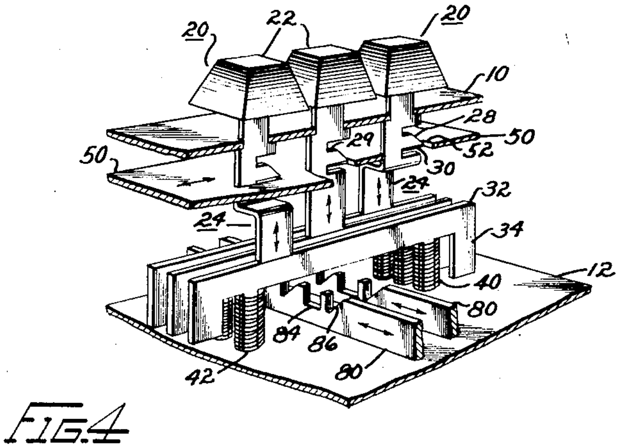
Fig. 4 is a perspective of a segment of the arrangement, showing the coaction of the keys, locking plate, and code bars. The arrangement is seen as if broken open approximately on the line 4—4 of Fig. 2, looking in the direction of the arrows.
Figure 7:
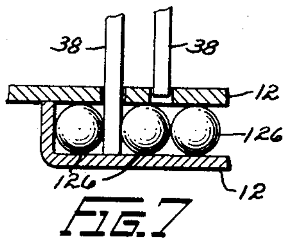
Fig. 7 is a partial detailed view of the locking ball arrangement shown in Fig. 3.

The depression of a keying mechanism 20 also provides the operation of the arrangement of locking balls 126 (seen in Figs. 3 and 7). Only one locking ball finger 38 may wedge between the locking balls 126. If the operator selects two key buttons 22 simultaneously, neither key button 22 will be fully depressed, nor will the power cycle be begun. Failure to select a key is readily apparent to the operator, who may then actuate the desired key button 22.

The selection of any key button 22, as stated above, results in the rearward movement of the locking plate 50. The edges of the locking holes 52 register with the holding notches 30 in the key stems 26. All keying mechanisms 20, other than the selected keying mechanism 20, are locked against movement until the selected key stem 26 is again free to move within the locking plate 50. Thus, when a key button 22 has been selected and a cycle begun, the arrangement prevents erroneous operation of other keys until the cycle has been completed and full signals provided. The power cycle is so rapid, however, that the speed of operation of the mechanism is not materially affected by this safety feature. Note that a key may be kept separate from the locking plate and locking ball arrangement if it is desired to operate some keying mechanisms in combination.

Thus there has been provided a keyboard mechanism having easy but positive selecting action. On proper selection of a key, binary and decimal outputs of substantially constant signal strength and duration are provided. Through use of locking and holding mechanisms, simultaneous selection of more than one key and too rapid repetition of key operation are prevented.

What is claimed is:

1. A keyboard comprising a plurality of manually movable key mechanisms having holding edges in a first plane and wedging edges in a second plane, said wedging edges intersecting said first plane on actuation of the associated key mechanisms, means for detecting movement of any of said key mechanisms and for providing a signal in response to said detected movement, a locking plate providing an engaging edge in said first plane for each of said key mechanisms, and means responsive to said signal for reciprocating said locking plate in said first plane so that engaging edges register with the holding edges of unselected key mechanisms and wedge against the wedging edges of selected key mechanisms.

2. A keyboard for providing a coded output comprising a plurality of manually movable key mechanisms, each of said key mechanisms having a holding edge in a first common plane and a driving edge in a given spaced relationship to said first common plane, said driving edge being moved toward said first common plane when the key mechanism is manually moved, a plurality of code bar means each responsive to all said key mechanisms, a predetermined position pattern of said code bars being provided by each of said key mechanisms, a plurality of output switch means each responsive to the position of a different code bar means, a locking plate mounted in said first common plane, said locking plate having an engaging edge for each key mechanism and being movable in said first common plane to register said engaging edges with said holding edges, and cyclical driving means responsive to the movement of any key mechanism for moving said locking plate to register said engaging edge with the holding edge of unmoved key mechanisms and with the driving edge of the moved key mechanism.

3. A keyboard for providing a coded output comprising a plurality of key mechanisms mounted in parallel relationship and each manually selectable and movable in a given direction in said parallel relationship, said key mechanisms each including on a like side a holding edge and a driving edge, each of said holding edges being in a first common plane normal to said key mechanisms, each of said driving edges being in a given spaced relationship to said first common plane and slanted thereto, said driving edge moving toward said first common plane when the key mechanism is moved, said key mechanisms each having a selector bar surface in a second common plane normal to said key mechanisms, a plurality of code bars mounted in said second common plane and normal to said selector bar surfaces, each of said code bars having wedge surfaces in a predetermined pattern, said code bars being displaced in said second common plane in different combinations for each of said key mechanisms, said selector bar surfaces acting against said wedge surfaces when a key is moved, a plurality of output switches each responsive to the position of a different code bar, a locking plate mounted in said first common plane, said locking plate having a different engaging edge for each key mechanism and being movable in said first common plane to register each engaging edge with the corresponding holding edge, means for reciprocally moving said locking plate in a predetermined cycle with said locking plate registering with said holding edges, and means responsive to a movement of the driving edge of any key mechanism past said first common plane for actuating said means for reciprocally moving said locking plate to drive the moved key mechanism by the engaging edge against the slanted driving edge of said key mechanism.

4. In a keyboard having a plurality of key mechanisms, the combination comprising a stem portion for each of said key mechanisms, said stems being substantially parallel to each other and moving axially when the associated key mechanism is moved, said stems each having a holding edge in a first common plane normal to said stems and a driving edge slanted to said first common plane and movable through said first common plane when the associated key mechanism is moved, a locking plate in said first common plane, said locking plate having an aperture about each stem portion, means for reciprocally moving said locking plate in said first common plane to move the edges of said locking plate apertures into and then out of register with the associated holding edges of said stems, and means responsive to a movement of any of said key mechanisms such that the driving edge is past said first common plane for actuating said means for reciprocally moving said locking plate, whereby the edge of a locking plate aperture engages said driving edge and moves said stem and key mechanism.

5. In a keyboard having a plurality of key mechanisms movable substantially downwardly in response to manual actuation, the combination comprising a stem portion for each of said key mechanisms elongated in the direction of movement of said key mechanisms, each of said stem portions including a holding notch in a first common plane normal to said stem portion and a driving notch above said holding notch and having an edge slanted to said first common plane, first biasing means coupled to said key mechanisms and normally maintaining said holding notches in said first common plane, a locking plate in said first common plane having a plurality of apertures, a different one encompassing each of said stems, second biasing means coupled to said locking plate and normally maintaining the edges of said locking plate apertures away from said holding notches, means for moving said locking plate in said first common plane to register the edges of said locking plate apertures with said holding notches, a first switch means for energizing said means for moving, means responsive to movement of any of said key stems such that the slanted edge of said driving notch intersects said common plane, for actuating said first switch means whereby the moved key stem is driven by said locking plate, and a second switch means responsive to a predetermined position of said locking plate for deenergizing said means for moving.

6. A keyboard mechanism comprising a plurality of depressible key mechanisms, each of said key mechanisms being in parallel relation to the others and including a stem portion and a selector bar base normal to said stem portion, said stem portions having like holding notches in a first common plane and like slanted notches uniformly spaced apart from and above said holding notches, said selector bar bases having code bar engaging surfaces in a second common plane normal to said key mechanisms, a base structure including a base plate in a third common plane below and parallel to said second common plane and having a plurality of apertures therein, a plurality of sets of finger members extending downwardly from said selector bar bases through said base plate apertures, each finger member of a set extending from a different one of said bases, and all finger members of each set being in a line, means for biasing apart said selector bar bases and said base plate, a locking plate, having a plurality of apertures, in said first common plane, said locking plate having a rest position in which each of said apertures encompasses a different one of said stem portions, biasing means between said locking plate and said base structure to tend to hold said base plate in said rest position, means mounted in said base structure for selectively linearly shifting said locking plate in said first common plane to register the edges of said apertures in the holding notches of undepressed key mechanisms and against the slanted notches of depressed key mechanisms, a first switch means on said base structure for energizing said means for shifting, a bar member pivotally mounted in said base structure and actuating said first switch means in response to depression greater than a predetermined amount of any of a first set of said finger members, a second switch means on said base structure responsive to a predetermined shifting of said locking plate from said rest position for deenergizing said means for shifting, a first set of output switch means mounted in said base structure, each responsive to depression greater than a predetermined amount of a different one of a second set of said finger members, a closed-end channel member fixed below said base plate in the line of a third set of said finger members, locking ball means in said channel member for permitting depression greater than a predetermined amount of no more than one of said finger members of said third set, a plurality of code bars slidably mounted in said base structure in said second common plane and normal to said selector bar surface, each of said code bars providing predetermined notch patterns to said code bar engaging surfaces and said code bars together being moved in a predetermined combination by each of said key mechanisms, and a second set of output switch means, each responsive to the movement of a different one of said code bars.

7. A keyboard comprising a plurality of selectably movable key mechanisms each having a stroke movement, separate bar members each responsive to movement of a different one of said key mechanisms, switch means cooperative with each of said bars for providing an actuating signal in response to movement of any of said bars, a plate member cooperative with said key mechanisms, and means responsive to said actuating signal for driving said plate in a direction to concurrently lock unselected key mechanisms against movement and to complete the stroke movement of the selected key mechanism in a predetermined timed cycle.

8. A keyboard comprising a plurality of selectably movable key mechanisms, each of said mechanisms having a holding notch portion and a driving notch portion, signalling means for detecting movement of any of said key mechanisms and for providing a signal in response thereto, a locking plate, and a drive means responsive to said signal for driving said locking plate, said locking plate being cooperative with the notch portions of said key mechanisms for concurrently holding unselected key mechanisms against movement and driving the selected key mechanism.

9. A keyboard for providing a coded output comprising a plurality of selectably movable key mechanisms, code bar means each having notched portions and each being responsive to movement of said key mechanisms, a predetermined position pattern of said code bars being provided by movement of each of said key mechanisms, output signal providing means responsive to the position pattern presented by said code bar means, means for detecting movement of any of said key mechanisms and for providing a signal in response to said detected movement, a locking plate cooperative with said key mechanisms for concurrently locking unselected key mechanisms against movement and moving the selected key mechanism, and drive means responsive to said motion detected signal for driving said locking plate.

10. A keyboard comprising a plurality of key mechanisms each having a stroke movement, means responsive to a partial stroke movement of any selected key mechanism for providing an electrical signal, a drive means actuated by said electrical signal, and a plate driven by said drive means and cooperative with said key mechanisms for simultaneously locking unselected key mechanisms against movement and completing the said partial stroke movement of the said selected key mechanism.

References Cited in the file of this patent

UNITED STATES PATENTS

| | | |
|---|---|---|
| 757,601 | Dement | Apr. 19, 1904 |
| 1,154,355 | Wales | Sept. 21, 1915 |
| 1,164,737 | Mead | Dec. 21, 1915 |
| 1,357,423 | Robb | Nov. 2, 1920 |
| 1,528,018 | Hamann | Mar. 3, 1925 |
| 1,924,357 | Griffith | Aug. 29, 1933 |
| 2,741,427 | Drake | Apr. 10, 1956 |